United States Patent
Kumar et al.

(10) Patent No.: US 9,009,648 B2
(45) Date of Patent: Apr. 14, 2015

(54) AUTOMATIC DEADLOCK DETECTION AND AVOIDANCE IN A SYSTEM INTERCONNECT BY CAPTURING INTERNAL DEPENDENCIES OF IP CORES USING HIGH LEVEL SPECIFICATION

(71) Applicants: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, San Jose, CA (US)

(72) Inventors: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 237 days.

(21) Appl. No.: 13/745,684

(22) Filed: Jan. 18, 2013

(65) Prior Publication Data
US 2014/0204735 A1 Jul. 24, 2014

(51) Int. Cl.
*H04L 12/26* (2006.01)
*H04L 12/801* (2013.01)

(52) U.S. Cl.
CPC ..................... *H04L 47/12* (2013.01)

(58) Field of Classification Search
CPC ............................ H04L 47/122; H04L 47/12
See application file for complete search history.

(56) References Cited

U.S. PATENT DOCUMENTS

| | | | | |
|---|---|---|---|---|
| 4,933,933 A | * | 6/1990 | Dally et al. | 370/406 |
| 5,105,424 A | * | 4/1992 | Flaig et al. | 709/243 |
| 5,163,016 A | * | 11/1992 | Har'El et al. | 716/102 |
| 5,432,785 A | | 7/1995 | Ahmed et al. | |
| 5,583,990 A | * | 12/1996 | Birrittella et al. | 712/29 |
| 5,588,152 A | * | 12/1996 | Dapp et al. | 712/16 |
| 5,764,740 A | | 6/1998 | Holender | |
| 5,859,981 A | * | 1/1999 | Levin et al. | 709/238 |
| 5,991,308 A | | 11/1999 | Fuhrmann et al. | |
| 6,003,029 A | | 12/1999 | Agrawal et al. | |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Naum B Levin
(74) *Attorney, Agent, or Firm* — Procopio, Cory, Hargreaves & Savitch LLP

(57) ABSTRACT

Systems and methods for automatically building a deadlock free inter-communication network in a multi-core system are described. The example implementations described herein involve a high level specification to capture the internal dependencies of various cores, and using it along with the user specified system traffic profile to automatically detect protocol level deadlocks in the system. When all detected deadlock are resolved or no such deadlocks are present, messages in the traffic profile between various cores of the system may be automatically mapped to the interconnect channels and detect network level deadlocks. Detected deadlocks then may be avoided by re-allocation of channel resources. An example implementation of the internal dependency specification and using it for deadlock avoidance scheme is presented on Network-on-chip interconnects for large scale multi-core system-on-chips.

18 Claims, 16 Drawing Sheets

(56) References Cited

U.S. PATENT DOCUMENTS

| | | | |
|---|---|---|---|
| 6,249,902 B1 | 6/2001 | Igusa et al. | |
| 6,415,282 B1 | 7/2002 | Mukherjea et al. | |
| 6,674,720 B1 * | 1/2004 | Passint et al. | 370/235 |
| 6,711,717 B2 * | 3/2004 | Nystrom et al. | 716/102 |
| 6,925,627 B1 | 8/2005 | Longway et al. | |
| 7,046,633 B2 * | 5/2006 | Carvey | 370/238 |
| 7,065,730 B2 | 6/2006 | Alpert et al. | |
| 7,318,214 B1 | 1/2008 | Prasad et al. | |
| 7,379,424 B1 * | 5/2008 | Krueger | 370/236 |
| 7,437,518 B2 * | 10/2008 | Tsien | 711/141 |
| 7,461,236 B1 * | 12/2008 | Wentzlaff | 712/10 |
| 7,509,619 B1 * | 3/2009 | Miller et al. | 716/102 |
| 7,590,959 B2 | 9/2009 | Tanaka | |
| 7,725,859 B1 | 5/2010 | Lenahan et al. | |
| 7,774,783 B2 * | 8/2010 | Toader | 718/104 |
| 7,808,968 B1 | 10/2010 | Kalmanek, Jr. et al. | |
| 7,853,774 B1 * | 12/2010 | Wentzlaff | 712/10 |
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedle et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,407,425 B2 * | 3/2013 | Gueron et al. | 711/146 |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0037888 A1 * | 2/2009 | Tatsuoka et al. | 717/135 |
| 2009/0070726 A1 | 3/2009 | Mehrotra et al. | |
| 2009/0172304 A1 * | 7/2009 | Gueron et al. | 711/154 |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2010/0158005 A1 * | 6/2010 | Mukhopadhyay et al. | 370/392 |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2012/0173846 A1 * | 7/2012 | Wang et al. | 712/32 |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 * | 3/2014 | Philip et al. | 710/306 |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |
| 2014/0211622 A1 * | 7/2014 | Kumar et al. | 370/235 |
| 2014/0254388 A1 * | 9/2014 | Kumar et al. | 370/238 |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, Jan. 22, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Informaiton Technology (CIT 2010), Jun. 2010, pp. 62-67.

International Search Report and Written Opinion for PCT/US2014/012003, Mar. 26, 2014, 9 pgs.

\* cited by examiner

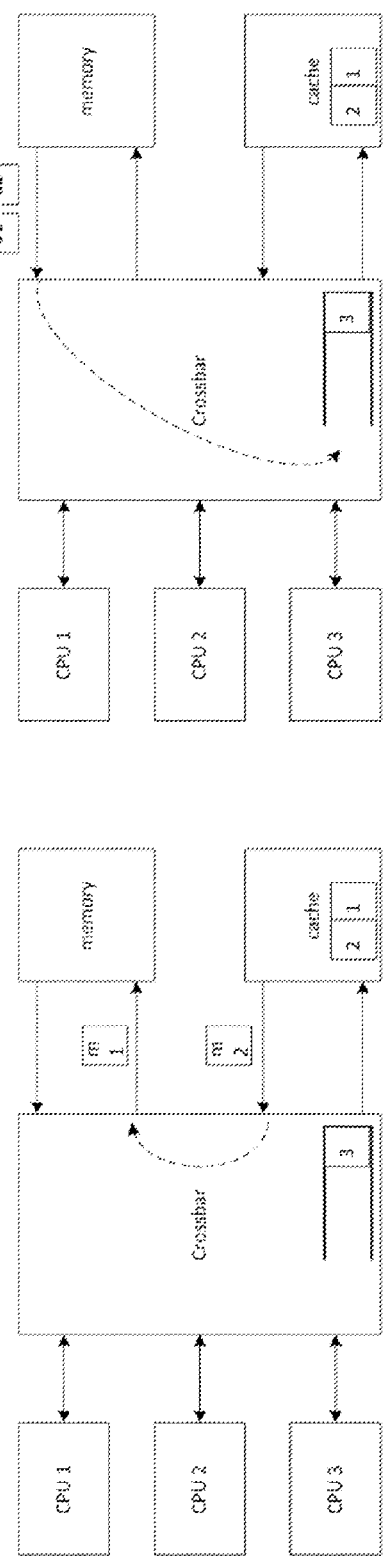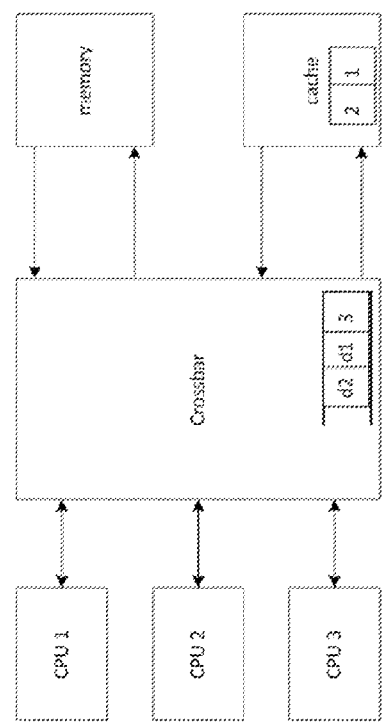
FIG. 5(a)
FIG. 5(b)
FIG. 5(c)

AUTOMATIC DEADLOCK DETECTION AND AVOIDANCE IN A SYSTEM INTERCONNECT BY CAPTURING INTERNAL DEPENDENCIES OF IP CORES USING HIGH LEVEL SPECIFICATION

BACKGROUND

1. Technical Field

Methods and example implementations described herein are generally directed to interconnect architecture, and more specifically, to network on chip systems interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several possible topologies in which the routers can connect to one another to create the system network. Bi-directional rings (as shown in FIG. 1(*a*)), 2-D (two dimensional) mesh (as shown in FIG. 1(*b*)) and 2-D Taurus (as shown in FIG. 1(*c*)) are examples of topologies in the related art. Mesh and Taurus can also be extended to 2.5-D (two and half dimensional) or 3-D (three dimensional) organizations.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may be implemented in hardware, maintain packet ordering and may be rendered free of network level deadlocks. Shortest path routing may minimize the latency as such routing reduces the number of hops from the source to the destination. For this reason, the shortest path may also be the lowest power path for communication between the two components.

Dimension-order routing is a form of deterministic shortest path routing in 2-D, 2.5-D, and 3-D mesh networks. In this routing scheme, messages are routed along each coordinates in a particular sequence until it reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until it reaches the final destination router. Dimension ordered routing is often minimal turn and shortest path routing.

FIG. 2 pictorially illustrates an example of XY routing in a two dimensional mesh. More specifically, FIG. 2 illustrates XY routing from node '34' to node '00'. In the example of FIG. 2, each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects often employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

A standard n×m mesh NoC can connect n×m cores. The maximum latency of n×m mesh NoC is n+m−1 hops, when the hosts at the two far end corners inter-communicate. To minimize the latency n and m must be chosen to be as close as possible, creating a more square like topology. In this case, as the network scales in size, the maximum latency is on the order of $n^{1/2}$, where n is the total number of nodes in the NoC. Using a taurus topology, latency can be further reduced.

Deadlock occurs in a system NoC interconnect when messages are unable to make forward progress to their destination because the messages are waiting on one another to free up resources (e.g. at buffers and/or channels). Deadlocks due to blocked buffers can quickly spread over the entire network, which may paralyze further operation of the system. Deadlocks can broadly be classified into network level deadlocks and protocol level deadlocks.

Deadlock is possible within a network if there are cyclic dependencies between the channels in the network. FIG. 3 illustrates an example of network level deadlock. In the example of FIG. 3, starting at a state with all buffers empty, the blocks initiate the message transfer of A→C, B→D, C→A and D→B simultaneously. Each block takes hold of its outgoing channel and transmits the message toward its destination. In the example of FIG. 3, each channel can hold only one message at a time. From this point on, each channel waits on the next channel to move the message further. There is a cycle in the channel or message dependency graph and the network becomes deadlocked. Such network level deadlock or low-level deadlocks can be avoided by construction using deadlock free routing or virtualization of paths using multiple virtual channels and keeping them from back pressuring each other.

Network end points may not be ideal sinks, i.e. they may not consume all incoming packets until some of the currently outstanding packets are processed. If a new packet needs to be transmitted during the processing of an outstanding packet, a dependency may be created between the NoC ejection and injection channels of the host. The dependency may become cyclic based upon the message sequence, position of components and routes taken by various messages. If the deadlock is caused by dependencies external to the network layer, this is called a high-level, protocol or an application level deadlock. In related art systems, most high level tasks involve a message flow between multiple hosts and ports on the NoC in a specific sequence. Software applications running on large multi-core systems often generate complex inter-communication messages between the various hosts and ports. Such a multi-point sequence of intercommunication may introduce complex dependencies resulting in protocol level deadlock in the system interconnect.

The underlying cause of deadlock remains some form of channel, buffer and message dependency cycle introduced by the inter-dependent messages between one or more ports of one or more hosts. Independent messages from one end point to another on the network do not cause protocol level deadlocks; however, depending on the routing of such messages on the network, network level deadlocks are still possible in the system.

FIGS. 4(a), 4(b) and FIGS. 5(a) to 5(c) illustrate an example of protocol level deadlock. Consider an example of a three central processing unit (CPU) system connected to memory and cache controller through a crossbar. The cache controller's interface to the interconnect has a single First-In-First-Out (FIFO) buffer which can hold a maximum of three messages. Internally, the cache controller can process up to two requests simultaneously (and therefore process up to two outstanding miss requests to the memory).

At FIG. 4(a), all three CPUs send read requests to the cache controller.

At FIG. 4(b), read requests are queued in an input buffer to the cache controller from the crossbar.

At FIG. 5(a), the cache controller accepts two requests '1' and '2' from input buffer while the third request '3' remains in the input buffer. '1' and '2' have a read miss in the cache, which in turn issues miss refill requests 'm1', 'm2' to the memory At FIG. 5(b), the memory returns refill data 'd1', 'd2'. This data gets queued behind '3' in the cache controller's input buffer.

At FIG. 5(c), the cache controller waits for refill data for the outstanding requests before accepting new request '3'. However the refill data is blocked behind this request '3'. The system is therefore deadlocked.

In this system, deadlock avoidance can be achieved by provisioning additional buffer space in the system, or using multiple physical or virtual networks for different message types. In general, deadlock is avoided by manually 1) interpreting the intercommunication message sequence and dependencies, 2) then allocating sufficient buffers and virtual and/or physical channels and 3) assigning various messages in the sequence the appropriate channel.

In large scale networks such as the internet, deadlocks are of a lesser concern. Mechanisms such as congestion detection, timeouts, packet drops, acknowledgment and retransmission provide deadlock resolution. However such complex mechanisms have substantial limitations (e.g., design cost) in terms of power, area and speed to implement on interconnection networks where the primary demands are low latency and high performance. In such systems, deadlock avoidance becomes a critical architectural requirement.

SUMMARY

The present application is directed to automatic identification of protocol level deadlocks and automatic construction of a system interconnect which is free from network and protocol level deadlock deadlocks, based upon a specification of the internal dependencies present in various cores in the system, and the system traffic profile—a list of all intercommunication messages between various channels of various cores. An example implementation of 1) the process of capturing the internal dependencies present within a core and between other cores in a system, using high level specification, 2) using the specification and the system traffic profile to detect protocol level deadlocks and to construct a deadlock free system NoC interconnect is also disclosed. The deadlock avoidance is achieved while reducing the interconnect resource cost by reusing buffers and NoC channels.

Aspects of the present application may include a method, which involves, the specification of the dependencies between various messages and channels internal to the cores and inter-core message and channel dependencies.

Aspects of the present application may include a computer readable storage medium storing instructions for executing a process. The instructions may involve, capturing the specification of the dependencies between various messages and channels internal to the cores and inter-core message and channel dependencies.

Aspects of the present application may include a method, which involves, for a network on chip (NoC) configuration including a plurality of cores interconnected by a plurality of routers in a heterogeneous or homogeneous mesh, ring or taurus arrangement, generating a deadlock free system using the internal and inter-core message and channel dependency specification; and configuring each of the plurality of virtual routers to carry various messages.

Aspects of the present application may include a system, which involves a core internal dependency specification module configured to capture one or more dependencies present in a first core based on a processing of a high level specification of the first core.

BRIEF DESCRIPTION OF THE DRAWINGS

FIGS. 5(a) to 5(c) illustrate message exchange in the memory subsystem causing protocol level deadlock.

DETAILED DESCRIPTION

Applications running on large multi-core systems can result in a variety of messages flowing between various transmit and receive channels of various cores. When a message arrives at the receive channel of a core, the message is accepted for processing. Often during the processing, the core may wait for additional messages to arrive at certain receive channels of the core or may need to send new messages at certain transmit channels of the core and subsequently may wait for their responses to arrive. The processing resources allocated for the message cannot be freed up until all dependent transactions for the message are completed, therefore a dependency is created between the message being processed and the messages that are either expected to be transmitted or received.

There may be cases when certain messages need to be transmitted or received by other cores before this core can complete processing the message, thereby creating more complex dependencies between multiple cores. Different cores in a system may have different behavior in the way they process the arriving messages, and the processing may depend on other messages being received or transmitted at this core or at other cores in the system. In a more complex application running on a variety of different cores, many complex dependencies may exist e.g. a deadlock may occur, if a cyclic dependency forms.

The present application is directed to using a specification to characterize behavior of cores used in the system and to automatically analyze and avoid protocol level deadlocks. The specification attempts to capture the internal dependencies present within the core between various messages being transmitted and received by the core and the other cores. Example implementations described herein are based on the concept of capturing various core's internal dependencies by using a high level dependency specification and then using the specification along with the system traffic profile to automatically detect protocol level deadlocks in the system and construct a deadlock free 2-D, 2.5-D and 3-D NoC interconnects. The system traffic consists of a list of all messages exchanged between transmit and receive channels of various cores. Examples of such a high level dependency specification, automatic protocol level deadlock identification, and a process of the automatically construct deadlock free interconnect are also disclosed.

Figure 1A:
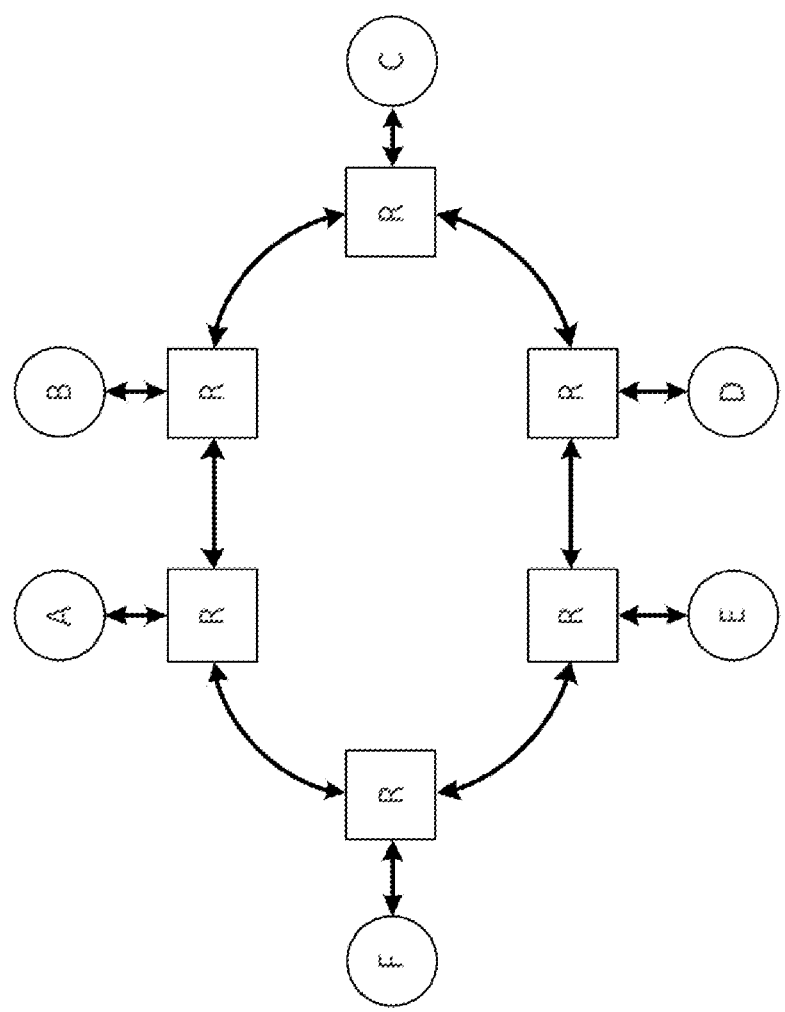
FIGS. 1(a), 1(b) and 1(c) illustrate examples of Bidirectional ring, Mesh, and Taurus NoC Topologies.
Figure 1B:
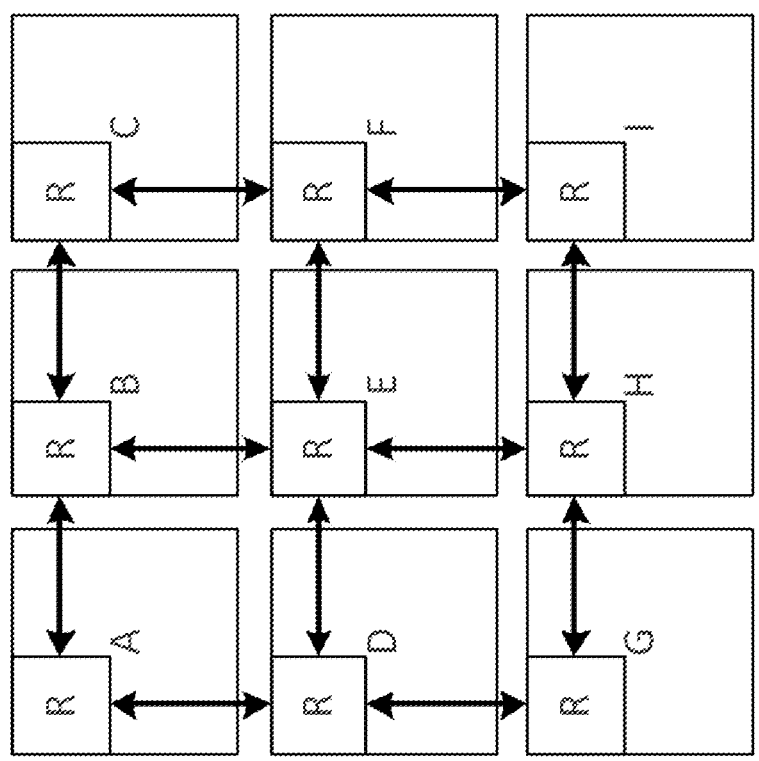
Figure 1C:
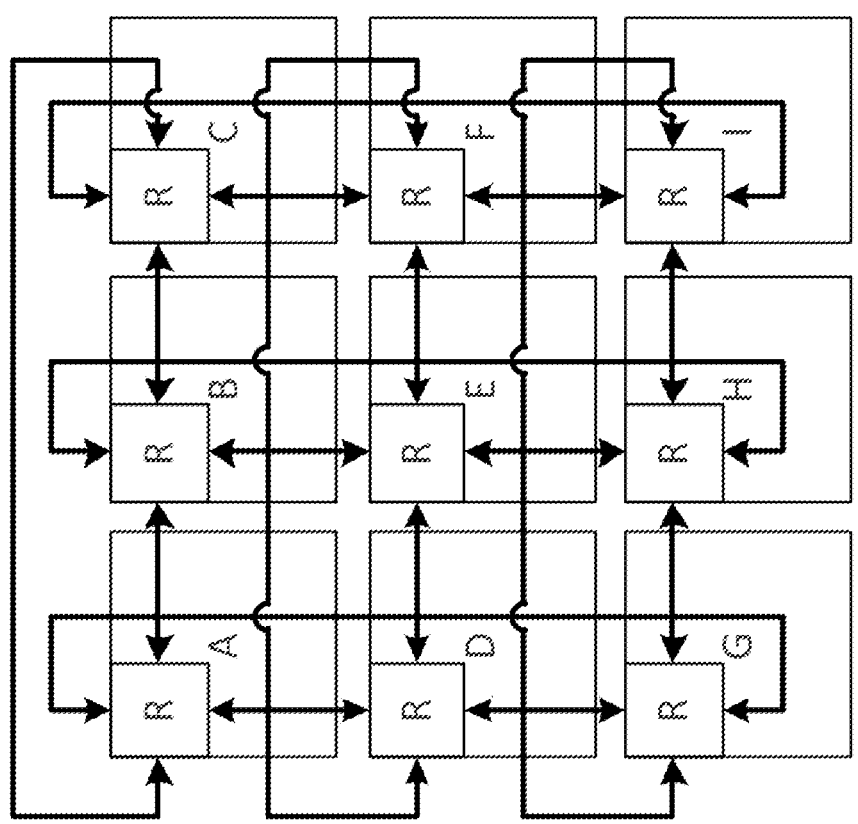
Figure 2:
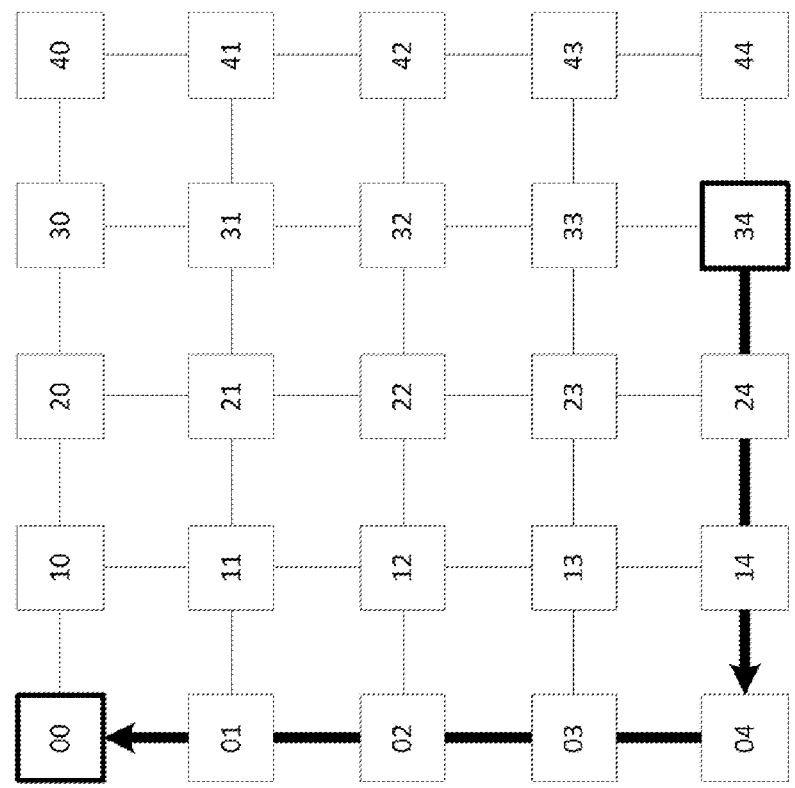
FIG. 2 illustrates an example of XY routing in a two dimensional mesh.
Figure 3:
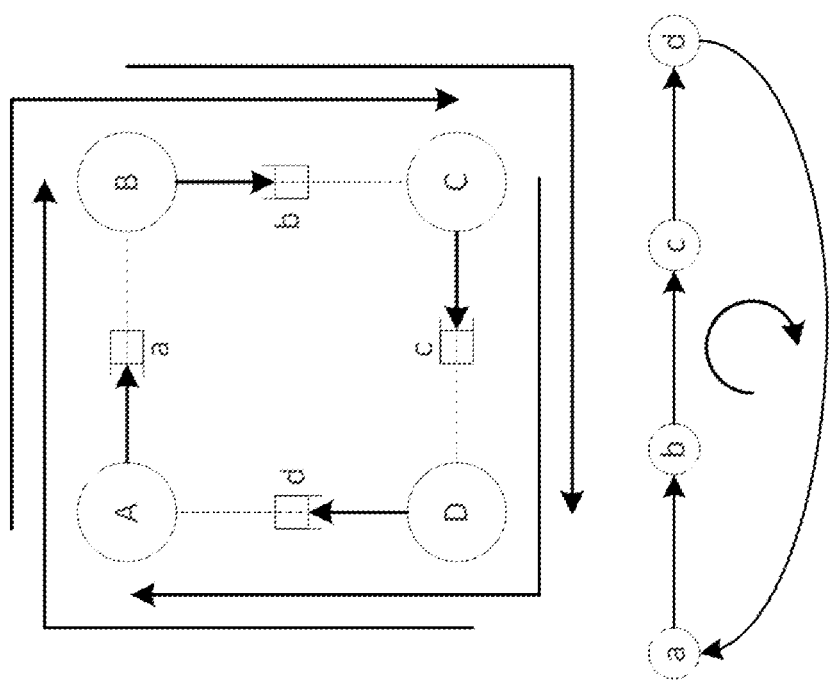
FIG. 3 illustrates an example of network level deadlock.
Figure 4A:
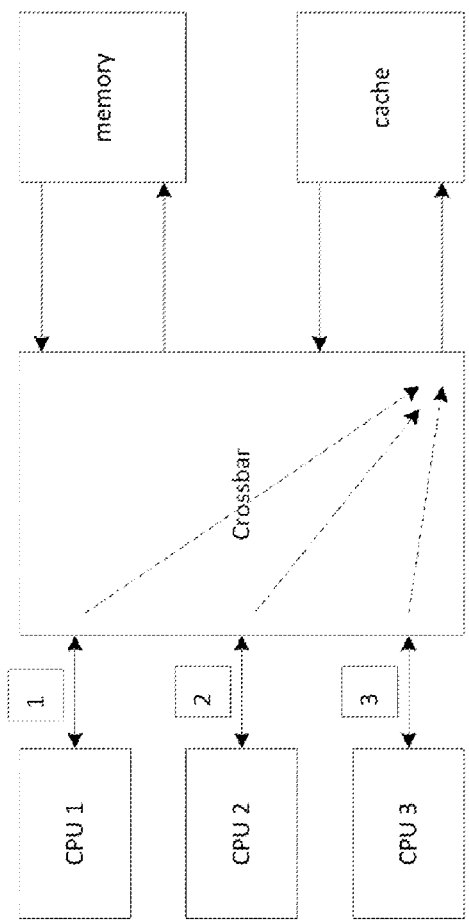
FIGS. 4(a) and 4(b) illustrate an example memory subsystem with three CPUs issuing read requests to cache controller.
Figure 4B:
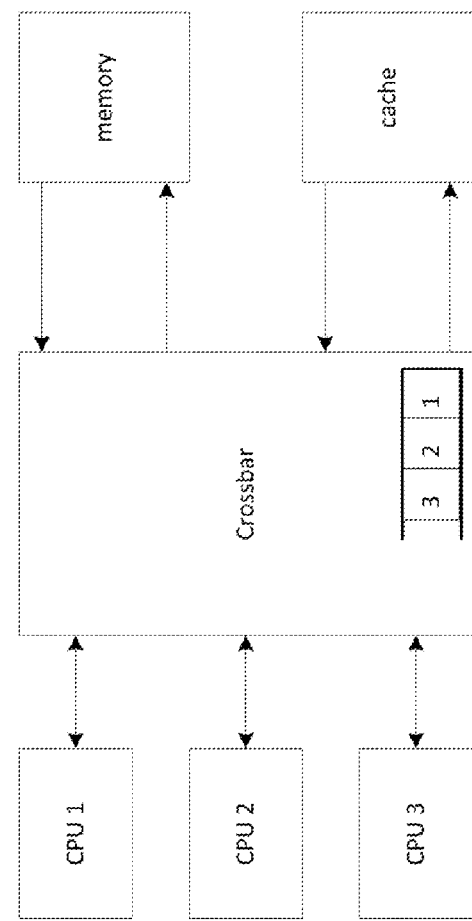
Figure 6A:
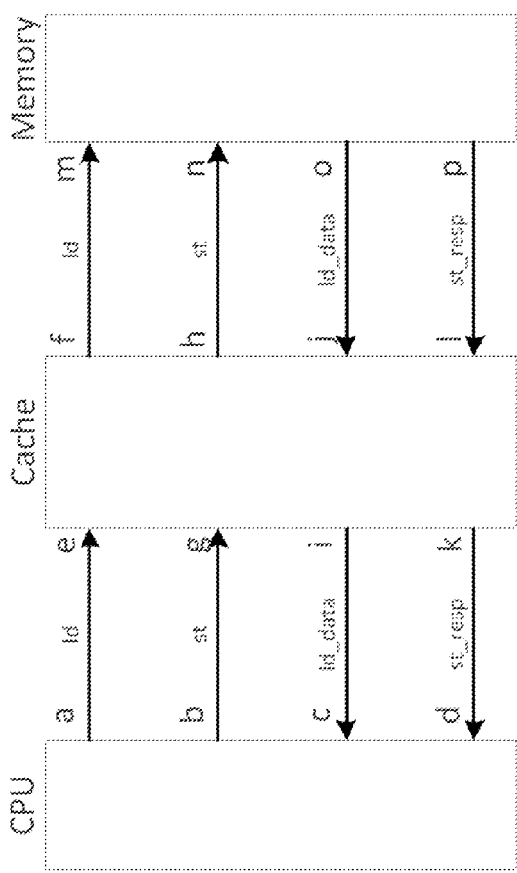
FIG. 6(a) illustrates message exchanges between CPU, cache and memory based on the system traffic profile.

An example specification to describe kinds of internal dependencies that may be present in a core is presented, and how the example specification can be used to detect deadlocks is explained. Consider a system shown in FIG. 6(a). A CPU uses transmit channels a and b to send ld and st messages on receive channels e and g respectively of cache. Cache may have a miss and a dirty line may have to be written back, in which case cache will use its channels f and h to send ld and st messages to the receive channels m and n of the memory. Memory then uses the transmit channels o and p to send ld_data and st_resp messages which are received by cache on channels j and l. Cache then sends the ld_data and st_resp messages at transmit channels i and k to the receive channels c and d of the CPU. If cache has a hit, then the cache directly sends the ld_data and st_resp messages to the CPU. In this example system, the system traffic profile includes a list of messages and their source and destination cores and channels such as the one shown below.

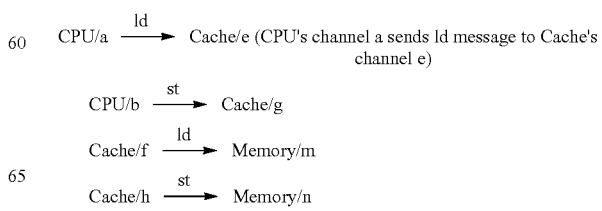

-continued

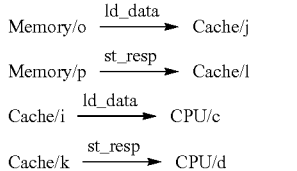

Figure 6B:
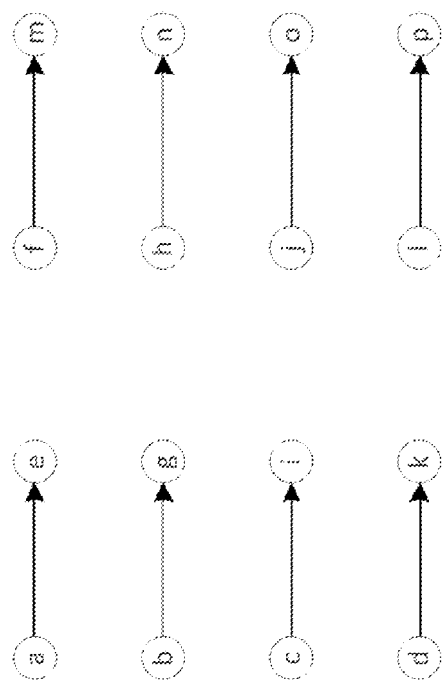
FIG. 6(b) illustrates the resulting dependency graph.
Figures 7A, 7B:
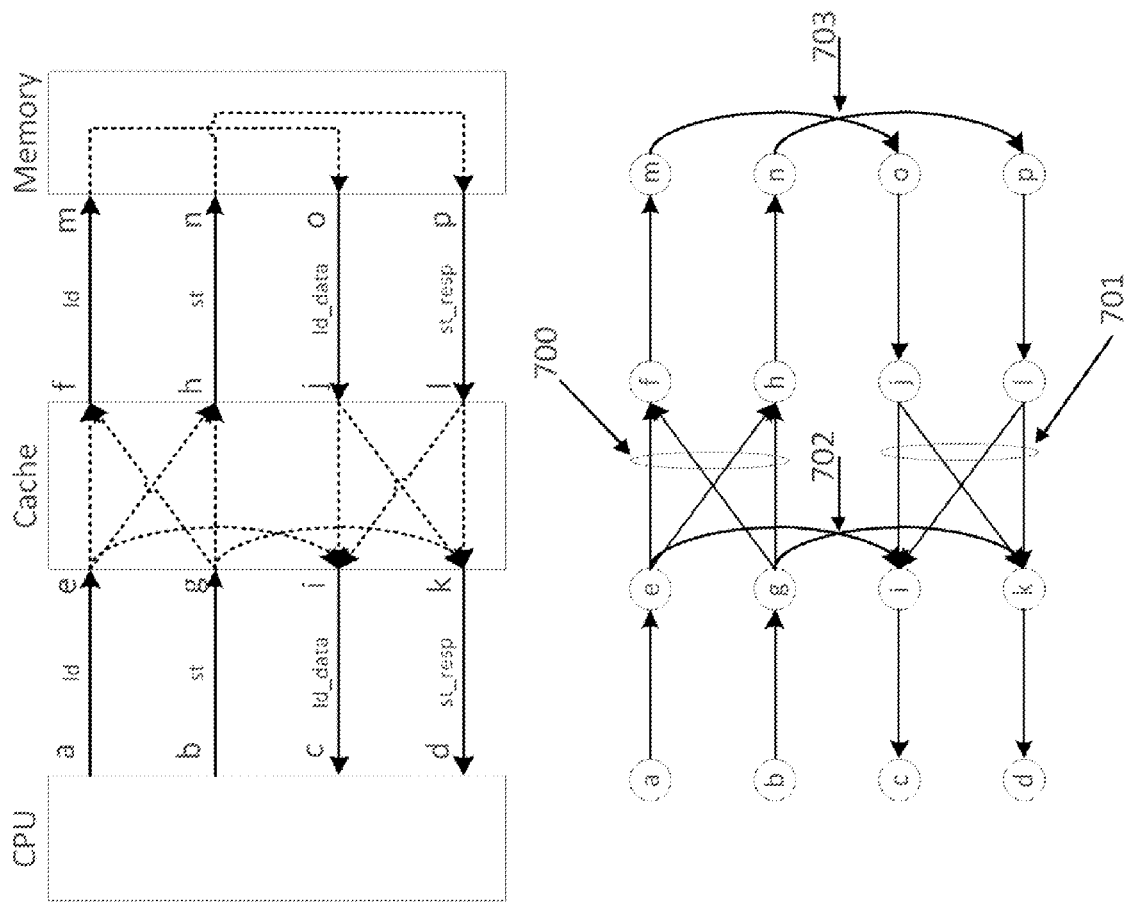
FIG. 7(a) illustrates the message exchanges and the resulting internal dependencies within the cores based on core's internal dependency specification.
FIG. 7(b) illustrates the resulting dependency graph.

Since only one type of message is present at a channel in this example, this message exchange creates respective dependencies between various channels of the cores which is shown in FIG. 6(b). In this dependency graph, only the pairwise inter-core channel dependencies due to the system traffic are present; internal dependencies present in various cores are not present. To capture the entire system dependency, a specification for the internal dependencies present in CPU, cache and memory cores are designed. CPU issues ld and st messages and waits for ld_data and st_resp respectively. If ld and st are issued without having to depend on any other transaction and ld_data and st_resp are always accepted and consumed upon arrival at the CPU, then there is no internal dependencies in the CPU. In cache, arriving ld and st messages may result in a cache miss, which may generate a refill ld message and wait for the refill response, the ld_data message. If a dirty line needs to be replaced then an additional writeback, st message, may be generated and wait for the st_resp message. These internal dependencies are listed below.

ld message on channel e may produce ld message on channel f ld message on channel e may produce st message on channel h st message on channel g may produce ld message on channel f st message on channel g may produce st message on channel h Since there is a one to one correspondence between messages and channels, the message dependencies will result in channel dependency between channels e and f over which ld and st messages arrive and channels f and h over which refill and writeback messages are sent. These dependencies are shown as the arrows 700 in FIG. 7(b). After these messages are sent, and once the ld_data and st_resp response messages arrive from the memory, cache can continue processing the original ld or st message. In some cache designs, the ld_data and st_resp may be guaranteed to be accepted upon arrival, in which case there will not be any dependency for these messages, else following additional dependencies may be present at cache.

ld_data message on channel j may produce ld_data message on channel i st_resp message on channel l may produce ld_data message on channel i ld_data message on channel j may produce st_resp message on channel k st_resp message on channel l may produce st_resp message on channel k These dependencies are shown as the arrows 701 in FIG. 7(b). When all required messages are generated and responses are received, cache will send response messages (ld_data or st_resp) to the CPU and complete the processing of the ld or st message. This represents an additional dependency between channels e and i at which ld and st messages arrive and channels g and k at which responses are sent, respectively. This is shown using arrows 702 in FIG. 7(b).

In the memory, a ld message received produces a ld_data message while a st message produces a st_resp message. These dependencies are listed below and shown as arrows 703 in FIG. 7(b).

ld message on channel m produces ld_data message on channel o st message on channel n produces st_resp message on channel p With the specification of internal dependency between various messages and their corresponding channels of CPU, cache, and memory, a full dependency graph of the system can be constructed automatically as shown in FIG. 7(b). This dependency graph now contains both the inter-core dependencies based on the system traffic profile and the internal dependencies present in all cores. If a cycle is present in the graph then there may exist protocol level deadlock in the system.

There may exist additional dependencies within a core which are not obvious. For example, if the internal data path of memory is designed such that ld and st messages are processed by a common buffer and logic then all dependencies on channel m created by the ld message will also apply on channel n where st message is received and vice-versa. One may design the internal data path of memory such that certain types of messages may bypass others but no vice-versa. For example an arriving ld or st message must wait for st messages that are currently being processed in the core, but an arriving st message may bypass all ld messages that are currently being processed. In this case all dependencies of st message on channel n will apply to the channel m where ld messages are received but not vice-versa. Thus there is a need to carefully understand the internal design of a core and specify correct dependencies as part of the core's internal dependency specification.

Figure 8A:
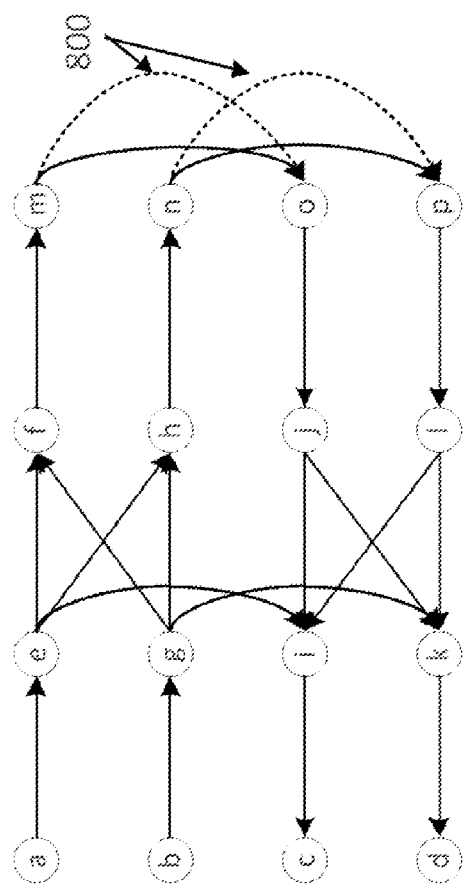
FIGS. 8(a) and 8(b) illustrate the dependency graphs if the internal dependency specifications of various cores are different.

Assuming that ld and st messages share a common data path in memory and there is no bypass policy (i.e. ld and st are processed in-order and ld does not bypass st and vice-versa), the dependencies of ld and st messages will apply on each other. The resulting dependency graph is shown in FIG. 8(a); the new dependencies are shown as dotted arrows 800. In spite of the new dependencies, there are no cycles in the graph therefore no protocol level deadlock is present.

One may use an alternative cache design such that a st message for writeback is not send on channel h immediately upon a miss, but only after arrival of the refill data (ld_data) message. Arriving ld_data message displaces the dirty cache line which will now be written back by sending a st message on channel h. The dependency specification in this cache will include the following additional entry.

ld_data message on channel j may produce st message on channel h

Figure 8B:
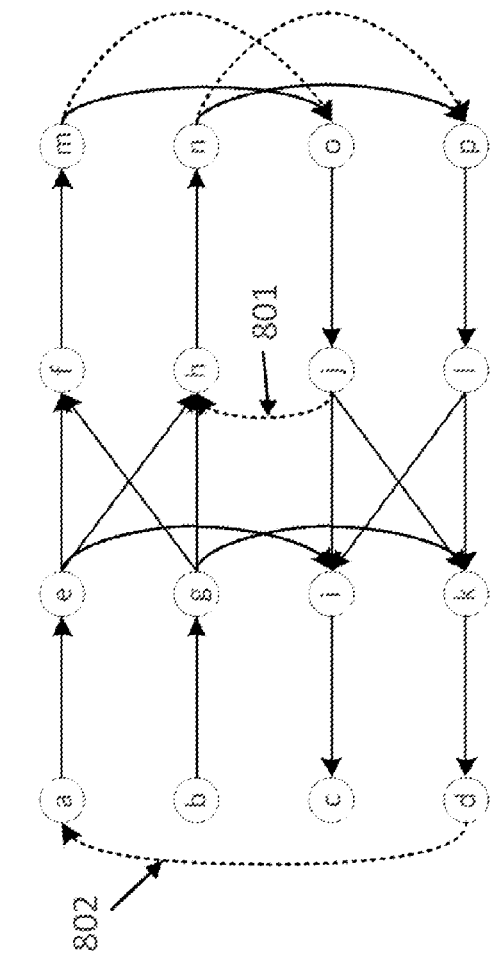

The dependency graph will include a new edge which is shown in FIG. 8(b) as the dotted arrow 801. There is a cycle in this graph and the resulting system therefore may have a protocol deadlock. As another example, one may use an alternative design for the CPU, in which an arriving st_resp on channel d may need to produce a ld message on channel a. The resulting edge in the dependency graph is shows as the dotted arrow 802 in FIG. 8(b). This edge adds more cycles in the dependency graph creating new deadlock scenarios. Such deadlocks are application or protocol level deadlocks, which can be avoided either by changing the system traffic profile or by altering the internal design of cores, thereby changing the internal dependency specification.

Figure 9:
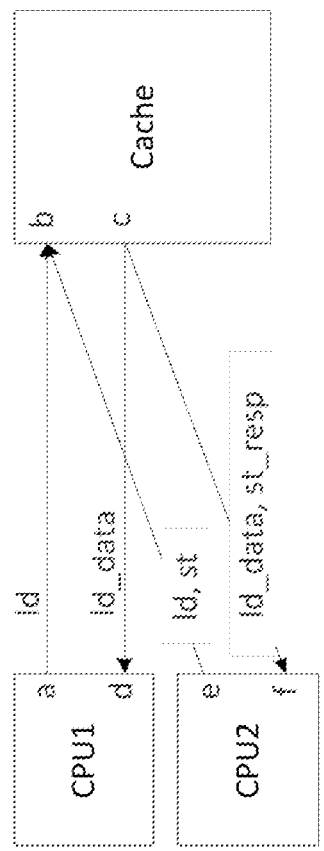
FIG. 9 illustrates an example wherein two CPUs talk to one memory and the receive and transmit channels carry different sets of messages.

One may design cores and systems where multiple types of messages go over a channel of a core. An example is shown in FIG. 9, where two CPUs CPU1 and CPU2 communicate with a cache. CPU1 sends ld message on channel a to channel b of the cache, and cache sends ld_data back on channel c which arrives on channel d of CPU1. CPU2 sends ld and st messages on channel e to channel b of cache and cache sends ld_data (for ld messages) and st_resp (for st message) response messages on channel c which arrives on channel f of CPU2. In this example, a channel may carry multiple messages. Furthermore between a pair of cores the transmit channel of one core and the receive channel of the other may have different sets of messages such as the transmit channel a of CPU1 which only transmits ld message, and receive channel b of memory which receives messages ld and st. This may occur when multiple channels of one or more cores are communicating to a channel at a core, or vice-versa. Thus there is a need to specify the internal dependencies of a core in form of messages which appear on various channels of the core. Subsequently the message based dependency specification of various cores can be automatically translated into channel dependency of the core based on the channels over which the specified messages are transmitted or received.

In the previous examples, all arriving messages within a core must transmit messages from the same core as the core from which they are being processed. There may be a system where a message at a core must produce another message at some other core. Such dependencies will span multiple cores and need to be specified as well. A core's internal dependency specification therefore may contain the core and channel id for every message specified. An example of such dependency specification is shown below.

ld message on channel i of core a produces st message on channel j of core b

There may be additional dependencies such as message which is being processed in a core must wait for certain other messages to arrive. While this dependency may appear different from a dependency where one message produces another, the dependency is equivalent to waiting for the producer of the message to transmit the message at the transmitting channel. Thus these dependencies can be specified using one of the previous produced based specifications.

With these example implementations of specifications detailing various kinds of internal dependencies present in a core and how they can be used to automatically detect protocol level deadlocks, further example implementations of a formal specification to describe internal dependencies within system cores can be provided. This sample specification assumes unique labels are used to identify all transmit and receive channels of all cores. It also assumes finite types of messages in the system and uses unique labels to identify each message. Following nomenclature is used.

There are d cores, each represented by $d\_i$ (i=0 to d−1).

Each core has multiple channels, represented by $d\_i(c\_j)$, the j-th channel of the i-th core. A channel can be transmit or receive channel but not both.

There are m types of messages in the system represented by $m\_i$ (i=0 to m−1).

A transmitting (receiving) channel may transmit (receive) a list of messages. The list will contain $d\_i(c\_j(m\_k))$ values, which represents a message id $m\_k$ on the channel id $d\_j$ of core id $d\_i$ of the system.

For every transmit message at a channel at a core, there are one or many corresponding receive channel at one or many cores, and vice-versa.

In this nomenclature the system traffic specification (not the internal dependency specification) will be a list of all messages between a pair of source and destination channels. Entries in this list will be in the form of a message id and a pair of transmit and receive channels such as $\{d\_i(c\_j(m\_k)), d\_l(c\_m(m\_k))\}$, i.e. message id $m\_k$ from transmit channel $c\_j$ of core $d\_i$ to the receive channel $c\_m$ of core $d\_l$.

The internal dependency specification of a core may involve a list of message/channel/core value pairs such as $\{d\_i(c\_j(m\_k)), d\_l(c\_m(m\_n))\}$ indicating that k-th message on the j-th channel of the i-th core depends on the n-th message on the m-th channel of the l-th core. In every pair's first item, the core is the current core being analyzed for capturing the respective dependencies, while the core of the second item may be any core. If the second item's core is a different core, then example implementations can indicate a dependency between a message at this core and a message at another.

If an arriving message at a channel is guaranteed to be accepted at a core, then there will not be any dependency in the core and the dependency may not exist in the core's internal dependency specification.

Once the internal dependency specification of all cores in the system and the system traffic specification are available, a dependency graph between various channels of the cores can be automatically constructed to detect deadlocks. An example construction algorithm will first add a graph node for every channel of every core in the system (step 1000 in FIG. 10). Then all entries in the system traffic specification are examined one by one and a dependency edge is added in the graph, if it is not already present (step 1001 in FIG. 10). For example, for an entry of $\{d\_i(c\_j(m\_k)), d\_l(c\_m(m\_k))\}$, a dependency edge in the graph between nodes $d\_i(c\_j)$ and $d\_l(c\_m)$ will be added.

Figure 10:
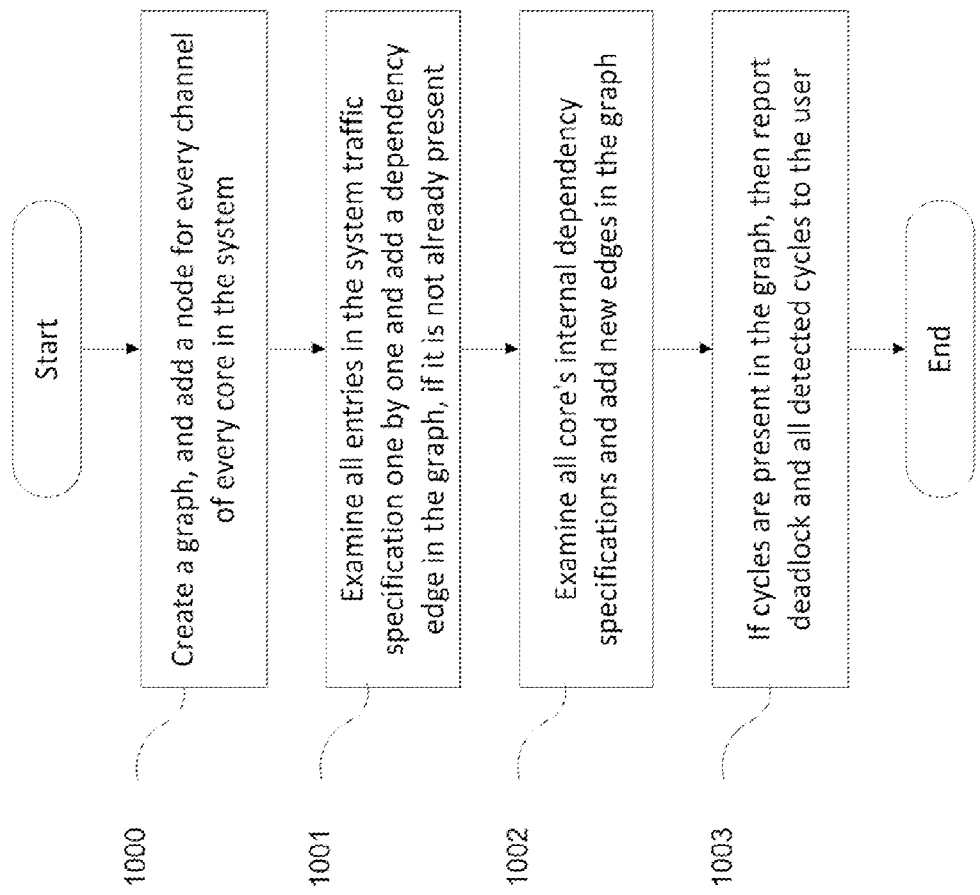
FIG. 10 is a flow chart illustrating a method of detecting protocol level deadlock in a system, in accordance with an example implementation.

Next, the core's internal dependency specifications are examined and new edges are added in the graph (step 1002 in FIG. 10). For an entry $\{d\_i(c\_j(m\_k)), d\_l(c\_m(m\_n))\}$, an edge is added between nodes $d\_i(c\_j)$ and $d\_l(c\_m)$ in the graph. Once all dependency edges are added in the graph, if a cycle is detected then the system may have a protocol level deadlock. All detected cyclic dependencies may be reported back to the user (step 1003 in FIG. 10). Users can then either update the system traffic profile or the core internal dependency design to address the deadlock.

The example implementation of internal dependency specification and dependency graph construction can be used for those cores where any message among the set of specified messages at a channel may appear without any restriction. For example if a channel can transmit st and ld messages at a channel, then there is no restriction that at any given time only ld or st messages may appear. There are certain system designs however, where a core may be allowed to transmit or receive certain types of messages at a channel at one time, and only after all transactions related to these messages are complete, other types of messages can be transmitted or received at the channel. The dependency specification and resulting channel dependency graph construction procedure in such systems need to be adjusted.

Figure 11A:
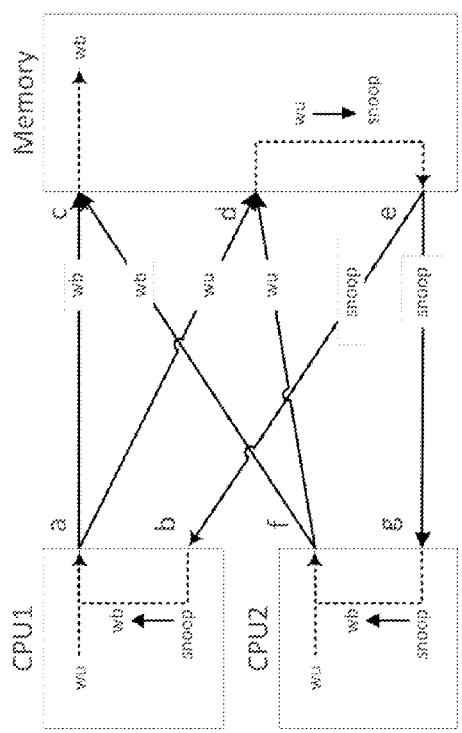
FIG. 11(a) illustrates a system graph where multiple interdependent messages appear at a channel at different times and FIG. 11(b) illustrates an incorrect dependency graph constructed for the system of FIG. 11(a).

Consider a system shown in FIG. 11(a). Here, two CPUs are connected to a memory using two channels at the CPUs and three channels at the memory. On channel a, CPU1 sends both wb (writeback) and wu (writeunique) messages; CPU2 sends these messages on channel f. Memory receives wb messages on channel c and wu messages on channel d. wb message is consumed by the memory upon arrival and an acknowledgement signal is used to notify the corresponding CPU (not shown in the figure). During processing of a wu message at the memory, memory may decide to send a snoop message on channel e which is received by CPU1 and CPU2 at channel b and g respectively. Snoop message is never sent to the CPU who sent the wu message; if wu arrived from CPU1, snoop is sent only to CPU2, and vice-versa. CPUs may decide to send a wb message back to the memory to complete the processing of a snoop message.

Figure 11B:
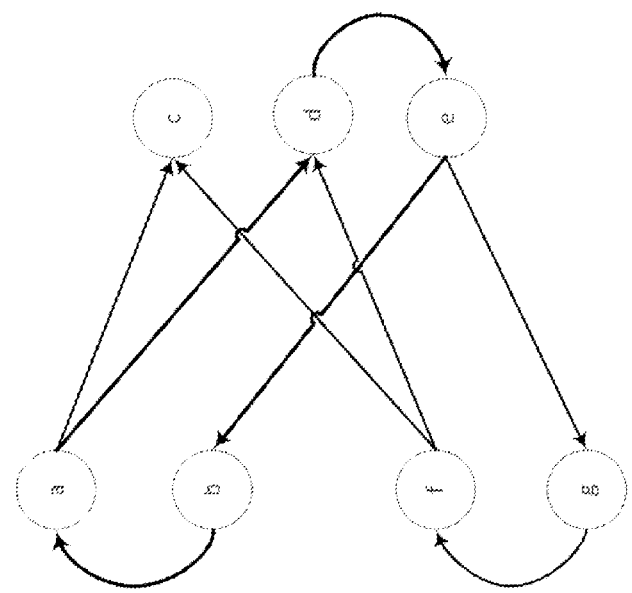

Subsequently, CPUs may notify to the memory that the snoop is processed completely by using an acknowledgement signal (not shown in the figure). Memory then notifies the CPU from where the original wu message was received about the completion of the wu message processing using another acknowledgement signal (not illustrated). wu message production at CPUs occur by themselves and not due to any dependency. The resulting channel dependency graph of this system is shown in FIG. 11(b). In this graph, there is a cyclic dependency between channels a, d, e and b and the system may have protocol level deadlock.

CPUs avoid the deadlock by putting constraints on message transmissions. The constraints may involve sending wu messages only when no wb messages from the CPU are pending in the system, by having each CPU maintain a count of all outstanding wb messages corresponding to the CPU; incrementing the count whenever the CPU sends a wb, and decrementing the count when the CPU receives a wb completion acknowledgment signal. The constraints may also involve, upon arrival of a snoop message, the CPU does not send a wb message if there is an outstanding wu issued by the CPU pending in the system, by having each CPU maintain a count of all its outstanding wu messages; incrementing the count whenever the CPU sends a wu, and decrementing the count when it receives a wu completion acknowledgment signal.

For a given CPU utilize the above constraints, either wu messages or wb messages will be present in the system, but never both. Thus, the dependencies of wu and wb messages will never appear simultaneously at a CPU and the resulting dependencies in the system may be different. The internal dependency specification of the cores should be able to represent such behavior—when multiple messages share a channel, certain types of messages may never be present in the system at the same time. In this example, the internal dependency specifications of CPUs are augmented with the following rule.

Dependencies of wb and wu messages never appear simultaneously on channel a/f

Figure 12:
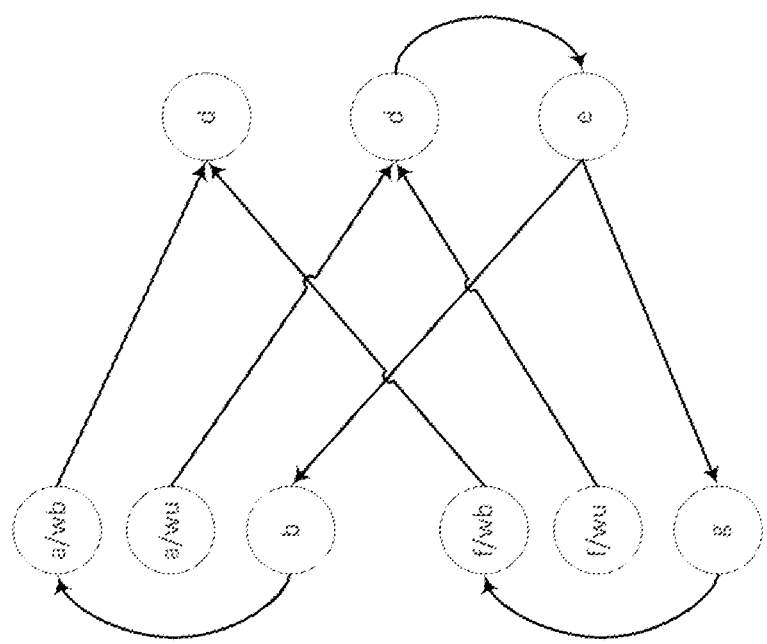
FIG. 12 illustrates the correct dependency graph of the system of FIG. 11(a), in accordance with an example implementation.

With this additional specification, the correct dependency behavior is reflected in the dependency graph by using two different nodes for wu and wb messages at the CPUs even if they share the same channel—nodes a/wb and a/wu at CPU 1 and f/wb and f/wu at CPU2. The dependencies of wb and wu are represented separately at these nodes. The resulting dependency graph is shown in FIG. 12. In this graph there are no cycles, therefore no protocol level deadlock exists in the system, which is the expected behavior. Notice that in this dependency graph, nodes are not necessarily per channel, but are per message or message groups for certain messages and channels.

The nomenclature and sample formal specification described previously in U.S. patent application Ser. No. 13/599,559, herein incorporated by reference in its entirety for all purposes, is now augmented to capture such behaviors of certain channels of certain cores in the system. At all channels, the list of messages transmitted or received at the channel is divided into multiple subsets, such that the dependencies of all messages in different subsets are guaranteed to never appear simultaneously and are herein referred to as independent message subsets. Let function S( ) map a message at a channel/core to its independent message subset. Subset for the k-th message on channel id d_j of core id d_i is represented by $S(d\_i(c\_j(m\_k)))$. A channel with a single message will have a single subset containing the single message. At a channel carrying one or more messages, there may be one or many independent message subsets. As part of the core's internal dependency specification, once all independent message subsets at all channels are described, a dependency graph can be constructed using the following procedure.

Add a graph node for every independent message subset at every channel of every core in the system. Next examine all entries in the system traffic specification one by one and add a dependency edge in the graph between the corresponding nodes, if it is not already present. System traffic specification entries are in the form of a pair $\{d\_i(c\_j(m\_k)), d\_l(c\_m(m\_k))\}$, and the corresponding nodes where an edge is connected are $S(d\_i(c\_j(m\_k)))$, and $S(d\_l(c\_m(m\_k)))$. Next the core's internal dependency specifications are examined and new edges are added in the graph. For an entry $\{d\_i(c\_j(m\_k)), d\_l(c\_m(m\_n))\}$, an edge is added between nodes $S(d\_i(c\_j(m\_k)))$, and $S(d\_l(c\_m(m\_n)))$. Once all dependency edges are added to the graph, if a dependency cycle is detected then the system has a protocol level deadlock. All detected cyclic dependencies may be reported back to the user.

Related art systems may employ semi-automatic analysis for detecting potential deadlocks in multi-core systems. However, the results are manually analyzed and suitable modifications to the system traffic profile, and the core's internal dependencies are made to avoid potential deadlocks. The example implementations of the present application involve a fully automatic method to detect protocol level deadlock in a multi-core system based on the system traffic profile and high level specification of internal dependencies in various cores. A high level specification is an abstract representation of the dependencies between various channels and messages at various IP cores in a system as opposed to a detailed design description. Several example embodiments of such high level specification are also presented.

Once a system is known to be protocol level deadlock free and no cycles are detected in the dependency graph, the messages need to be mapped to various channels of the interconnect to realize a deadlock free system interconnect. During this mapping it is important to ensure that no network level deadlocks arise. Example implementations allocate channel resources, and assign messages to the allocated channel resources to ensure that the generated interconnect is also deadlock free at the network level. The example implementations utilize the dependency graph generated during protocol level deadlock analysis and augments the graph with additional nodes to represent the interconnect channels and resources. As messages are mapped to the interconnect channels, new dependency edges are added to the graph. Any cyclic resource dependencies that arise in the dependency graph are removed through the use of multiple virtual and physical channels in the interconnect. Multiple virtual or physical channels between any two nodes of interconnect provides multiple isolated channels, as each channel has an independently allocated and flow controlled flit buffer in the network nodes. From now on we will use channels to refer to both physical and virtual channels in interconnect.

During mapping of messages on interconnect channels, each message in the system traffic profile needs to first identify a routing path in the network between its source and destination nodes, and then along the routing path allocate interconnect channels such that there is no network level deadlock. The example implementations attempt to map each message using the lowest possible channel ID on its routing path, adds the new dependency edges for the route and channel ID, looks for any new cycle in the graph. If a cycle forms, the example implementations use the next highest channel ID on the path to avoid the cycle. As a rule, example implementations first attempt to map on to any pre-allocated channels in increasing order of channel ID value and if no other pre-allocated channels remain on the path that does not form a cycle, allocate free channel IDs also in increasing order of channel ID value. This process continues till network routes of all the specified messages are mapped on the global dependency graph without any cycles. The algorithm aborts the effort if a deadlock free mapping of a message cannot be achieved with the constraint on the number of available interconnect channels. Other variations of the scheme are possible. For example, instead of using the same channel ID for all links of a route between two nodes, it is possible to use different channels on each link of a route. It is also possible for the algorithm to attempt to use different routes for various messages in order to reduce the channels usage, or for load balancing while maintaining deadlock avoidance.

The process of mapping messages to the interconnect channels and adding the resulting dependencies in the dependency graph is described in great detail in U.S. patent application Ser. No. 13/599,599. The distinction between the previous approach and the approach of the present applications is that mapping of messages on interconnect channels in the previous approach started from an empty dependency graph without any dependency edges, while in the current approach a dependency graph is first constructed based on the system traffic profile and internal dependency specification of various cores before any messages are mapped to the interconnect channels. Later when messages are mapped to the interconnect channels, new nodes to represent the interconnect channels and dependencies between them are added to the existing dependency graph. Another difference is that in the previous scheme, sequences of messages between multiple cores are mapped, while in the current scheme, messages listed in the system traffic profile are mapped individually between their source and destination nodes.

Example embodiments in U.S. application Ser. No. 13/599,559 involved mapping of sequence of messages between multiple cores because the internal dependencies in the core were captured using these sequences. Consequently, the previous approach can map SoC traffic on interconnect channels and avoid both protocol and network level deadlock when there are relatively simple internal dependencies within the cores such as an arriving message at a channel produces another message at a channel. However, when more complex and subtle dependencies within the cores arise due to the way core operates internally, then it may become difficult to describe them using a message sequence spanning multiple cores. The example implementations described in the present application can capture complex internal dependencies of a core using high level specification, and use them along with system traffic profile to ensure that there is no protocol level deadlock in the system.

The protocol level deadlock analysis is done before messages are mapped to the interconnect channels. Upon the protocol level dependency graph construction which captures all all internal dependencies within the cores and protocol level dependency between multiple cores based on system traffic profile, there is no need to map message sequences to the interconnect channels, as no new protocol level dependency needs to be captured. Each message can be mapped to the interconnect channels individually between its source and destination nodes.

Figure 13:
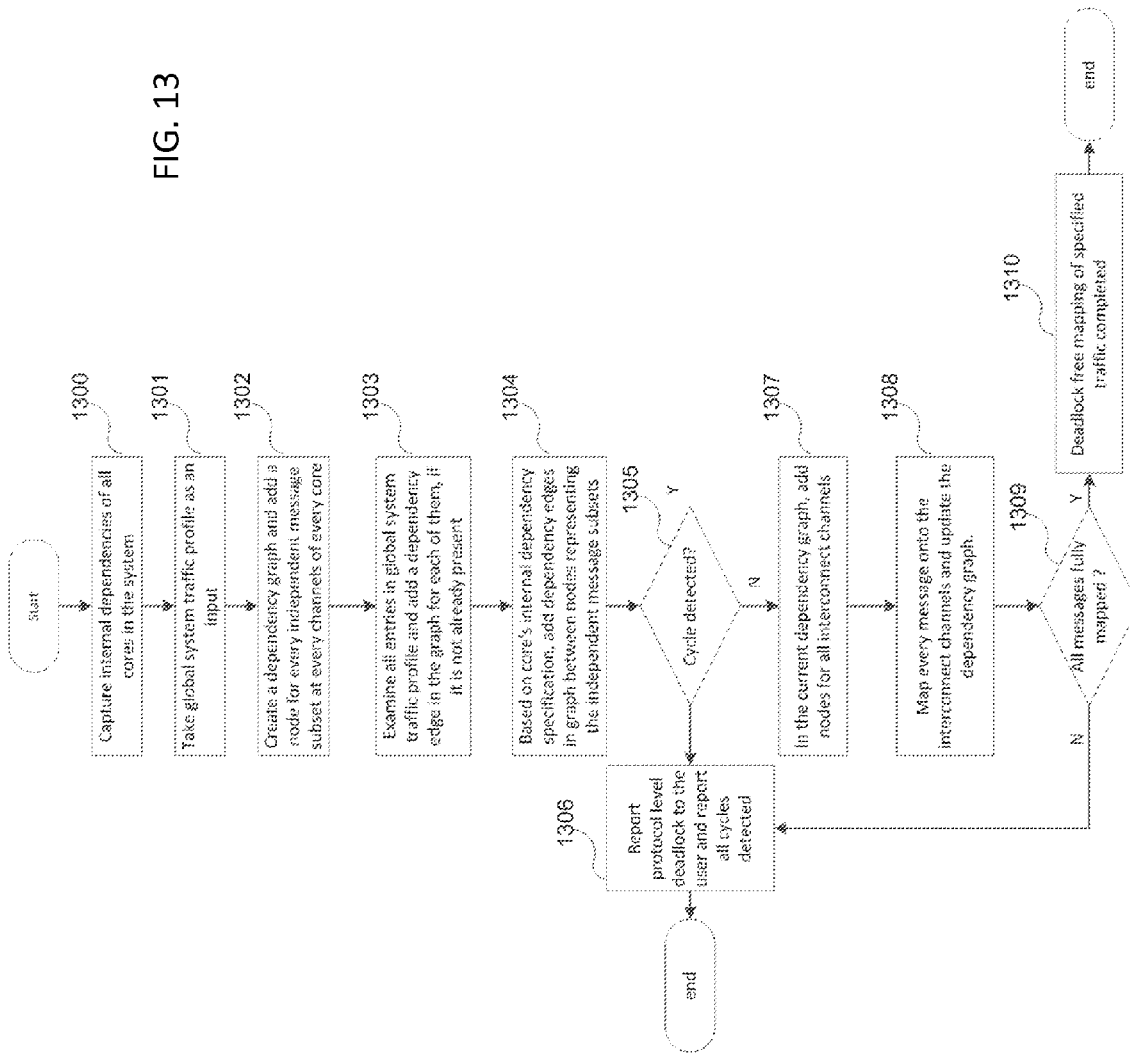
FIG. 13 illustrates a flowchart for internal dependency specification of various cores, using the specification along with the traffic profile for protocol level deadlock identification and then conducting deadlock free traffic mapping on a NoC, in accordance with an example implementation.

FIG. 13 illustrates a flowchart for detecting protocol level deadlocks in a system and deadlock free traffic mapping of traffic on a NoC interconnect channels using core's internal dependency specification and system traffic profile, in accordance with the example embodiments. In the implementation as depicted in FIG. 13, at 1300, the system uses high level specification to capture the internal dependencies within various cores in the system. At 1301, the system takes the system traffic profile information as an input. At 1302, the system begins building a dependency graph by adding a node for every independent message subset present at all channels of all cores. At 1303, the system begins to add edges to the dependency graph based on the system traffic profile. An edge is added for a message between a pair of cores, between the graph nodes representing the core's channel's independent message subset that contains the message. At 1304, the system begins to add edges to the dependency graph based on the core's internal dependency specification. Once all dependencies are added, at 1305, the system checks (e.g. automatically) for a cyclic dependency in the current dependency graph. At 1306, if a cycle is detected, then the system indicates (e.g., message to the user) a protocol level deadlock. User may decide to change the system traffic or core's design to address the deadlock. If no cycle is detected, then the system proceeds to 1307 and begins to add nodes to the current dependency graph. A node is added for each channel in the interconnect. The flowchart then proceeds to 1308 to map the messages in the system traffic profile to the interconnect channels using the procedure such as described in U.S. patent application Ser. No. 13/599,559. If all messages are mapped successfully without any cycle in the dependency graph then the system proceeds to 1310 to indicate (e.g., message to the user) a possible deadlock free mapping of the specified traffic.

Figure 14:
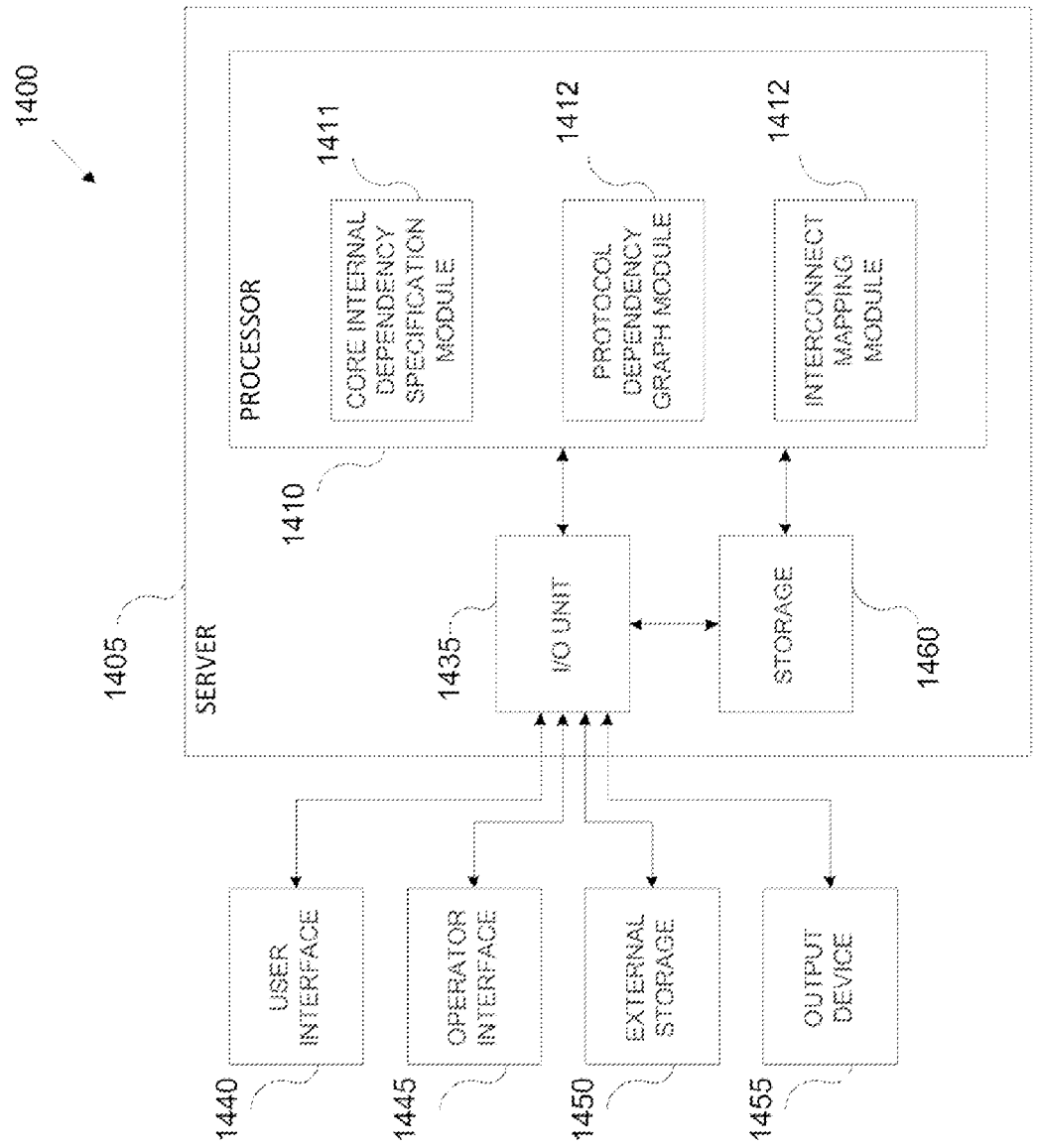
FIG. 14 illustrates an example computer system on which example implementations may be implemented.

FIG. 14 illustrates an example computer system 1400 on which example implementations may be implemented. The computer system 1400 includes a server 1405 which may involve an I/O unit 1435, storage 1460, and a processor 1410 operable to execute one or more units as known to one of skill in the art. The term "computer-readable medium" as used herein refers to any medium that participates in providing instructions to processor 1410 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1440 and operator interfaces 1445 which may utilize input devices such as a keyboard, mouse, touch device, or verbal command.

The server 1405 may also be connected to an external storage 1450, which can contain removable storage such as a portable hard drive, optical media (CD or DVD), disk media or any other medium from which a computer can read executable code. The server may also be connected an output device 1455, such as a display to output data and other information to a user, as well as request additional information from a user. The connections from the server 1405 to the user interface 1440, the operator interface 1445, the external storage 1450, and the output device 1455 may via wireless protocols, such as the 802.11 standards, Bluetooth® or cellular protocols, or via physical transmission media, such as cables or fiber optics. The output device 1055 may therefore further act as an input device for interacting with a user.

The processor 1410 may execute one or more modules. The core internal dependency specification module 1411 is configured to capture the internal dependencies within a core using a high level specification. The specification of every core in the system is stored internally for protocol level deadlock analysis later. The protocol dependency graph module 1412 may be configured to take the global system traffic profile and core's internal dependency specifications as the input and automatically construct a dependency graph consisting of various nodes and edges representing various dependencies in the system. This module may check for cyclic dependencies in the dependency graph to determine whether the system may have protocol level deadlocks and may report them to the user. The interconnect mapping module 1413 may be configured to map various messages in the traffic profile to interconnect channels if no protocol level deadlock is present and avoid network level deadlock using multiple channels in the interconnect.

The dependency specification module 1411, the protocol dependency graph module 1412, and the interconnect mapping module 1413 may interact with each other in various ways depending on the desired implementation. For example, protocol dependency graph module 1412 may be utilized to notify deadlock scenarios to the users and the internal dependency specification module 1411 may be used to capture any design or traffic changes users make to address the deadlock and then feed these changes back to the protocol dependency graph module 1412 for deadlock analysis. The interconnect mapping module 1413 may allocate channels based on resource sharing and minimization, load balancing or other possible factors and give feedback to the user if resources are exhausted and receive the new system configuration from the other two modules.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
utilizing a processor for capturing one or more dependencies present in a first core based on a processing of a high level specification of the first core in a Network on Chip (NoC) system configured to facilitate traffic for a System on Chip (SoC);
wherein the high level specification comprises:
dependency information between one or more messages received and transmitted by one or more channels of the first core, wherein the processing of the high level specification comprises converting the dependency information into channel dependencies;
identifying a usability of the first core in the NoC system based on the dependency information, and
producing one or more messages indicative of the captured one or more dependencies of the first core;
wherein the identifying the usability of the first core in the NoC system comprises at least one of:
determining whether the first core in the NoC system is deadlock free based on the dependency information; and
determining inter-operability between the first core and at least one core of the NoC system, based on the dependency information and a traffic profile of the NoC system.

2. The method of claim 1, further comprising:
determining a placement in the NoC system based on the usability of the first core in the NoC system.

3. The method of claim 2, further comprising generating an interconnect for the NoC system that is substantially free of at least one of a protocol level deadlock and a network level deadlock, based on the dependency information and a traffic profile of the NoC system.

4. The method of claim 1, wherein the high level specification comprises message information for one or more messages produced and transmitted, due to processing of a message by the first core.

5. The method of claim 1, wherein the capturing comprises processing the high level specification for multiple dependencies restricted to not appear substantially simultaneously, or to appear when a condition is met.

6. The method of claim 1, further comprising processing a system traffic profile and detecting protocol level deadlocks in a Network on Chip (NoC) system, based on the processing of the high level specification and the system traffic profile.

7. A non-transitory computer readable storage medium storing instructions for executing a process, the instructions comprising:
capturing one or more dependencies present in a first core based on a processing of a high level specification of the first core in a Network on Chip (NoC) configured to facilitate traffic for a System on Chip (SoC);
wherein the high level specification comprises:
dependency information between one or more messages received and transmitted by one or more channels of the first core, wherein the processing of the high level specification comprises converting the dependency information into channel dependencies;
identifying a usability of the first core in the NoC system based on the dependency information, and
producing one or more messages indicative of the captured one or more dependencies of the first core;
wherein the identifying the usability of the first core in the NoC system comprises at least one of:
determining whether the first core in the NoC system is deadlock free based on the dependency information; and
determining inter-operability between the first core and at least one core of the NoC system, based on the dependency information and a traffic profile of the NoC system.

8. The non-transitory computer readable storage medium of claim 7, wherein the instructions further comprise:
determining a placement in the NoC system based on the usability of the first core in the NoC system.

9. The non-transitory computer readable storage medium of claim 8, wherein the instructions further comprise generating an interconnect for the NoC system that is substantially free of at least one of a protocol level deadlock and a network level deadlock, based on the dependency information and a traffic profile of the NoC system.

10. The non-transitory computer readable storage medium of claim 8, wherein the high level specification comprises message information for one or more messages produced and transmitted, due to processing of a message by the first core.

11. The non-transitory computer readable storage medium of claim 8, wherein the capturing comprises processing the high level specification for multiple dependencies restricted to not appear substantially simultaneously, or to appear when a condition is met.

12. The non-transitory computer readable storage medium of claim 8, wherein the instructions further comprise processing a system traffic profile and detecting protocol level deadlocks in a Network on Chip (NoC) system, based on the processing of the high level specification and the system traffic profile.

13. A system, comprising:
   a processor configured to execute one or more modules, the one or more modules comprising:
      a core internal dependency specification module configured to capture one or more dependencies present in a first core based on a processing of a high level specification of the first core in a Network on Chip (NoC) configured to facilitate traffic for a System on Chip (SoC);
      wherein the high level specification comprises:
         dependency information between one or more messages received and transmitted by one or more channels of the first core, wherein the processing of the high level specification comprises converting the dependency information into channel dependencies;
      a protocol level dependency graph module configured to produce one or more messages indicative of the captured one or more dependencies of the first core;
      an interconnect mapping module configured to identify usability of the first core in the NoC system based on the dependency information by at least one of:
         determining whether the first core in the NoC system is deadlock free based on the dependency information; and
         determining inter-operability between the first core and at least one core of the NoC system, based on the dependency information and a traffic profile of the NoC system.

14. The system of claim 13, wherein the interconnect mapping module is configured to determine a placement in the NoC system based on the usability of the first core in the NoC system.

15. The system of claim 14, wherein the interconnect mapping module is further configured to generate an interconnect for the NoC system that is substantially free of at least one of a protocol level deadlock and a network level deadlock, based on the dependency information and a traffic profile of the NoC system.

16. The system of claim 13, wherein the high level specification comprises message information for one or more messages produced and transmitted, due to processing of a message by the first core.

17. The system of claim 13, wherein the capturing unit is configured to capture by processing the high level specification for multiple dependencies restricted to not appear substantially simultaneously or to appear when a condition is met.

18. The system of claim 13, wherein the protocol dependency graph module is configured to process a system traffic profile and to detect protocol level deadlocks in a Network on Chip (NoC) system, based on the processing of the high level specification and the system traffic profile.

\* \* \* \* \*